May 22, 1945.　　H. L. RAWLINS ET AL　　2,376,809
CIRCUIT INTERRUPTER
Filed Nov. 7, 1941　　2 Sheets-Sheet 1
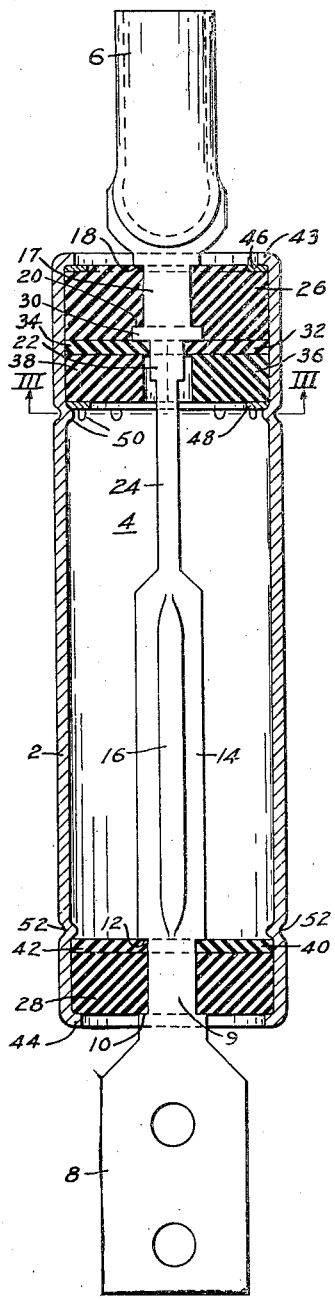
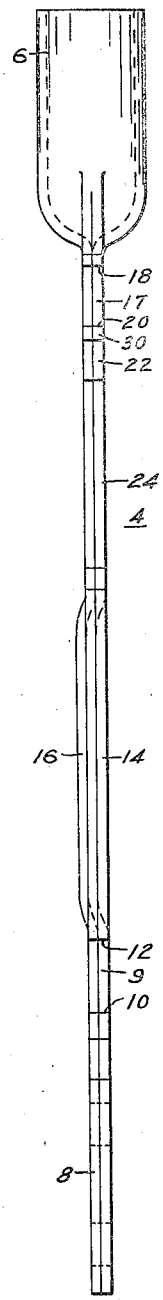
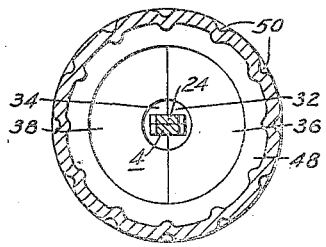
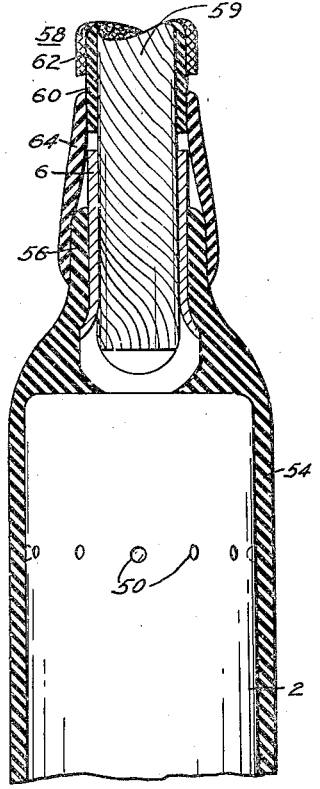
WITNESSES:
INVENTORS
Herbert L. Rawlins and
James M. Wallace.
BY
ATTORNEY May 22, 1945.  H. L. RAWLINS ET AL  2,376,809
CIRCUIT INTERRUPTER
Filed Nov. 7, 1941  2 Sheets-Sheet 2

WITNESSES:
N. F. Susser
Q. T. Stratton

INVENTORS
Herbert L. Rawlins and
James M. Wallace,
BY
Ralph H. Swingle
ATTORNEY

Patented May 22, 1945

2,376,809

UNITED STATES PATENT OFFICE 2,376,809

CIRCUIT INTERRUPTER

Herbert L. Rawlins, Wilkinsburg, and James M. Wallace, Braddock, Pa., assignors to Westinghouse Electric & Manufacturing Company, East Pittsburgh, Pa., a corporation of Pennsylvania Application November 7, 1941, Serial No. 418,148

28 Claims. (Cl. 200—131)

This invention relates, in general, to electric circuit interrupting devices and, more particularly, to interrupters of the fusible type adapted to interrupt very large amounts of current without any external display.

With the development in recent years of network distribution systems, it has become desirable to provide some means to prevent damage to sections of cable adjacent to or connected with the cable section in which the fault occurs. It is common practice in network systems to allow faults in any cable section to burn themselves clear, and the cable is of a size to carry heavy overload and short circuit currents for short times without damage. There are, however, many types of faults which are not self-clearing in short periods of time, and which may, therefore, cause extensive damage if allowed to persist. Therefore, in order to prevent such damage, it has been suggested that a limiting device in the nature of a fuse be provided for each cable section, preferably with such a limiting device at each end of a cable section, and with the limiting device being coordinated with the cable so as to interrupt the circuit on overloads or short circuits which would be great enough to heat the insulation of adjacent and interconnected cable sections to a point which would cause permanent damage. This type of fault occurs relatively infrequently and the expense of installing replaceable fuses of the ordinary high current type would be prohibitive.

Because these limiting devices are desired for the protection of cable, they should have a continuous current carrying rating identical with that of the cable, and should not interrupt the circuit on ordinary overloads which the ordinary fuse is designed to protect, that is, on currents ranging from fractional ampere ratings up to a few hundred amperes. Accordingly, a limiting device of the type described, should be capable of interrupting currents ranging from a minimum one or two thousand amperes on low voltage networks (110–208 volts) to as high as seventy-five thousand amperes on six hundred volt networks.

Another requirement of network limiting devices is that they be totally enclosed, preferably forming an integral part of the network cable, and that they be capable of interrupting the circuit without any external display. This is because the cables are usually installed underground where dampness or explosive atmosphere may be encountered, or in the newly developed high voltage networks for industrial application, the installation is usually indoors where safety requirements are more rigid.

In the copending application of L. R. Ludwig and P. O. Langguth, Serial No. 417,908, filed November 5, 1941, now Patent #2,354,134, issued July 18, 1944, and assigned to the same assignee as this application, there is disclosed a network limiting device which is totally enclosed and obtains high interrupting ability by providing a high voltage drop for the arc. The high voltage drop is obtained by the provision of series arcs which may be of the cold cathode type, and by the action of gas pressure on the positive column of the arc.

One limitation on the interrupting ability of a structure using a single fusible section in a complete enclosure, has been the high pressures developed, and one reason for such high pressures is that a relatively massive fusible section is needed, and this vaporizes almost instantly on high currents. Furthermore, this metal vapor is a conducting gas, and for this reason it is desirable to get rid of it.

Accordingly, one object of this invention is to provide a fuse having a novel enclosure of a strong heat conducting material to condense the metal vapor formed upon blowing of the fusible element.

Another object of this invention is to provide a totally enclosed circuit interrupter employing a single fusible section, yet being capable of interrupting high currents.

Another object of this invention is to provide a novel interrupter enclosure structure of conducting material with terminals carried by insulating plugs.

Another object of this invention is the provision of a novel type of conductor including a fusible section for a high capacity interrupter.

Another object of this invention is to provide a novel type of high interrupting capacity fusible interrupting device, which is entirely enclosed and yet is simple in construction and economical to manufacture.

Another object of this invention is to provide in an interrupter of the type described having high current interrupting ability, novel means for aiding in extinguishing low current arcs.

Another object of this invention is to provide a novel cooperation of insulated cable and entirely enclosed cable limiting device enclosed in a continuous sheath of insulation.

These and other objects of this invention will become more apparent upon consideration of the following detailed description of preferred embodiments thereof, when taken in connection with the attached drawings, in which:

Figure 1 is a longitudinal sectional view of a network limiting device constructed in accordance with this invention, with certain of the parts shown in elevation;

Fig. 2 is an elevational view of the conductor rod employed in the interrupter shown in Fig. 1, looking at the rod in a direction at right angles to Fig. 1;

Fig. 3 is a transverse sectional view taken substantially on the line III—III of Fig. 1;

Fig. 4 is a longitudinal sectional view of the interrupting device and a network cable assembled therewith, with the interrupter and cable conductor being shown in elevation;

Figure 5:
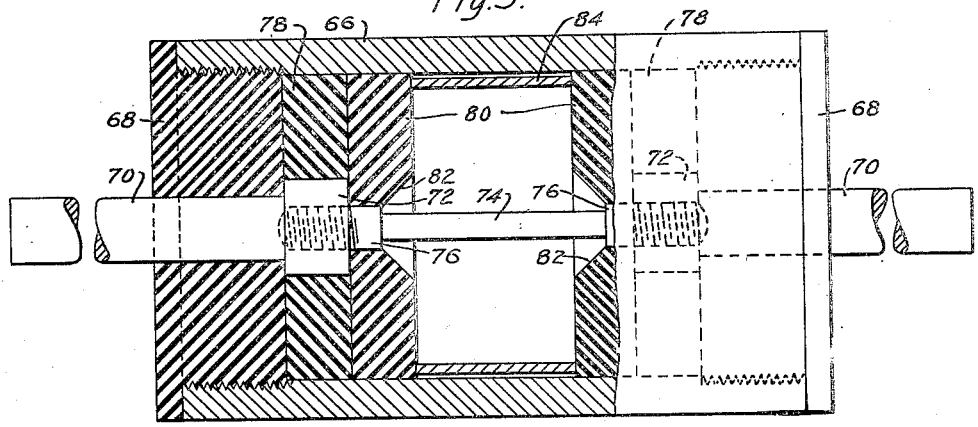
Fig. 5 is a longitudinal sectional view partially in elevation of a modified form of interrupting device.

The form of network limiter shown in Figs. 1 to 4 of the drawings comprises a tubular casing 2, of a strong material which is a good conductor of heat, such, for example, as copper, steel, or the like. The reason for making tubular casing 2 of a good heat conducting material will become more apparent during the description of the operation of the device. A unitary rod structure 4 is adapted to be supported within casing 2 and extend from the opposite ends thereof, and this rod may be of any good electrical conducting material, such, for example, as copper or a copper alloy. Conducting rod 4 is preferably made from a piece of tube stock which is flattened throughout its length excepting at one end to provide a terminal socket for the reception of a cable conductor. After flattening the tube, the opposite sides thereof are cut away except, of course, at terminal socket 6 and at the opposite end thereof to provide at this end a flat terminal lug 8. As is apparent from Figs. 1 and 2, the sides of the flattened tube are cut away adjacent terminal lug 8 to form a section 9 reduced in area, with shoulders 10, 10 and 12, 12 at opposite ends of reduced section 9. Shoulders 12 are provided at one end of an elongated terminal strip 14, and this terminal strip may have a rib 16 pressed out from one surface thereof for reinforcing purposes. At the opposite end of terminal strip 14, the side edges of the tube are further cut away to provide a fusible section 24 having a cross-sectional area less than that of any other part of conductor rod 4. Adjacent terminal socket 6, the flattened tube is cut away to form a section 17 similar to section 9 adjacent terminal lug 8, and section 17 is also provided with shoulders 18 and 20 at opposite ends thereof, respectively. The projecting portions of rod 4 forming shoulders 20 provide oppositely extending lugs 30, and a relatively short terminal section 22 is located between this portion and fusible section 24. It will be noted that the cross-section area of terminal section 22 is substantially less than that of terminal strip 14 for a purpose hereinafter referred to. In order to maintain the flattened sides of the tube from which conductor rod 4 is formed, after the flattened portions have been cut away, these sides are preferably secured together in any desired manner, such, for example, as by brazing, welding, riveting or the like.

Closure plugs 26 and 28 are provided for closing the opposite ends of tubular casing 2, and these plugs are of insulation material, preferably an insulation material having a high mechanical strength, such as a molded insulation material. The plugs 26 and 28 are preferably molded directly on conductor rod 4, with the plug 26 having one side thereof positioned against shoulders 18 on conductor rod 4, and with shoulders 20 and projections 30 on the rod being embedded in the opposite side of the plug. Closure plug 28 is positioned so that one side thereof bears against shoulders 10 on conductor rod 4, and the opposite side thereof is spaced from shoulders 12 for a purpose to be described. At the inner side of closure plug 26, there is located a spacing and protective disk preferably formed in two halves 32, 34, in order to facilitate assembly thereof on the conductor rod, and each half is provided with a centrally located rectangular shaped slot to closely fit about terminal section 22 of the conductor rod. Disk 32, 34 may be of any desired insulation material which is resistive to an electric arc, such, for example, as fiber or the like, in order to protect closure plug 26 from the products of the arc formed so that the closure plug will not be damaged by the arc. Inwardly of disk 32, 34, there is provided a circular block also preferably constructed in two halves 36, 38 to facilitate assembly on the conductor rod. Each half 36 and 38 is provided with a semi-circular notch centrally of the straight side thereof to form, when placed together, a circular arc passage about terminal section 22 of the conductor rod, and one end of fusible section 24, with the walls of the passage spaced somewhat from terminal section 22 and fusible section 24. The material comprising block 36, 38 is of an insulating material having the property of evolving an arc-extinguishing gas when in proximity to an electric arc, such, for example, as fiber, boric acid, a synthetic resin, or the like. A protective disk is also provided for closure plug 28, and this disk, like protective disk 32, 34, is also preferably formed in two half sections 40, 42, respectively, and each section is provided with a rectangular shaped notch so that, when assembled, the sections will closely fit about reduced section 9 of the conductor rod 4, between closure plug 28 and shoulders 12 formed on terminal strip 14. Protective disk 40, 42 is provided for the same purpose as protective disk 32, 34, and accordingly, may be of the same material.

In order to maintain the conductor strip and closure plugs in assembled relation relative to tubular casing 2, and to prevent relative endwise movement thereof, the ends of the casing are bent or spun over the closure plugs as shown at 43 and 44, respectively, in order to prevent outward movement of the plugs. In order to prevent inward movement of the closure plugs, protective disks and block 36, 38, the material of casing 2 is preferably punched inwardly at a plurality of points 50 adjacent the inner side of block 36, 38, and at a plurality of points 52 adjacent the inner side of protective disk 40, 42. In order to prevent damage to closure plug 26 and block 36, 38 during the spinning-over operation of casing 2 and during formation of indentations 50, protective washers 46 and 48 may be provided between the inwardly bent portions of the casing and the adjacent surfaces of closure plug 26 and block 36, 38. These protective washers 46 and 48 are preferably of a rigid material such as metal. It will be noted that protective disk 40, 42 acts to protect closure plug 28 during formation of indentations 52 on the casing in a manner similar to the way in which washers 46 and 48 protect the parts at the opposite end of casing 2.

With the structure described above, it will be noted that conductor rod 4 is securely anchored relative to closure plugs 26 and 28 by virtue of the plugs being molded thereon, and by the movement limiting action of laterally extending shoulders 10, 12, 18, and 20, so that there is no possibility of movement of the conductor rod longitudinally relative to the closure plugs. Furthermore, the closure plugs are securely anchored against longitudinal movement relative to casing 2 by the spun-over portions 43 and 44 of the casing, preventing relative outward movement of the plugs, and indentations 50 and 52 preventing relative inward movement of the plugs. Accordingly, it is readily apparent that casing 2, conductor rod 4 and closure plugs 26, 28 are all securely anchored against relative movement of any of these parts. It has been found that the specific mounting and anchoring means of the parts referred to above are particularly effective in a circuit interrupting device of this character which may be called upon to interrupt currents of the order of 70,000 amperes, because in an entirely enclosed construction such as that shown in Figs. 1 to 4, the pressures encountered upon a circuit interrupting operation are of the order of 1,000 to 2,000 pounds per square inch. Also, by the use of a metal casing 2, a much stronger casing wall can be provided, and at the same time the interrupting device may be kept within reasonable weight and dimensional limitations.

As previously stated, the interrupting device forming the subject matter of this invention is especially designed for the protection of cable insulation, and, therefore, the fusible section 24 thereof is not intended to melt except on currents much higher than the ratings of the conventional type of fuse. Thus, the minimum melting current which may be encountered will be of the order of a thousand amperes, whereas conventional fuses are designed to interrupt the circuit on maximum currents of a few hundred amperes. Because of the high melting current, it is necessary that the cross section of fusible section 24 be relatively large so that a relatively large amount of metal will be contained in the fusible section. Accordingly, upon currents above the safe value for the insulation of the cable being protected, fusible section 24 will melt, and at high currents the metal in this section will be almost instantly vaporized, providing a high pressure within casing 2 due to the presence of the vaporized metal. This metallic vapor moreover is a conducting gas, and it is highly desirable to eliminate it. Therefore, as soon as this vaporized metal comes into contact with the walls of tubular casing 2, it will instantly condense and leave a deposit of metal on the walls. Thus, by making tubular casing 2 of metal or other good heat conducting material, the metal vapor is removed from the arc space almost as quickly as it is produced, and the pressure developed within the casing is kept below a pressure which might blow it to pieces. It is, therefore, apparent that because of the condensing nature of tubular casing 2, the interrupter is capable of interrupting higher current arcs than a similar construction having non-condensing walls.

When fusible section 24 melts an arc will be struck between the inner end of terminal section 22 and the inner end of terminal strip 14. The upper end of this arc, as viewed in Fig. 1, will be contained within the arc passage formed through block 36, 38, and since this block is of a gas evolving material as described above, the gases evolved from the material of the block will cause a gas blast to blow into the arc to aid in extinguishing it. Because of the high pressure generated by melting of fusible section 24, the arc will also have a high voltage drop across the positive column of the arc, as described in the previously mentioned copending application of Ludwig and Langguth, which will also contribute to its extinction. When fusible section 24 melts, terminal section 22 having a cross section only slightly larger than fusible section 24, may be at least partly melted off thereby allowing the arc to move further back into the arc passage formed in block 36, 38, and subjecting a greater length of this arc passage to the arc so that more gas will be evolved from the block. Terminal section 22 is purposely made small enough in cross section so that a portion thereof will be melted upon fusion of section 24 to expose more of the arc to gas evolving material 36, 38 and obtain a predetermined amount of arc extinguishing gas. At the same time terminal section 22 is made large enough in cross section so that it will not be all melted off to thereby prevent the arc from going past disk 32, 34 and damaging closure plug 26.

Fig. 4 illustrates the manner in which the interrupting device shown in Figs. 1 to 3 may be associated with a network cable 58. As shown in this figure, the entire interrupting device is adapted to be enclosed in a sheath 54 of insulating material, preferably rubber or the like, so that the sheath may be molded directly on the interrupter. This sheath preferably includes a sleeve portion 56 about at least the inner portion of terminal socket 6. The network cable 58 illustrated, includes a stranded conductor 59 having an inner covering 60 of insulation material, such, for example, as rubber or the like, and an outer protective covering 62 which may be of braid. In assembling the interrupting device shown in Figs. 1 to 3 with network cable 58, inner and outer coverings 60, 62 are preferably removed from the end of conductor 59 a distance slightly greater than the amount the conductor may be inserted in terminal socket 6. With the bare end of conductor 59 inserted in terminal socket 6 and secured therein in any desired manner, such, for example, as by crimping, swedging or the like, a connecting sleeve 64 which is preferably slipped on to the cable prior to insertion of conductor 59 in terminal socket 6, may be then moved to the position in Fig. 4 wherein it overlaps insulation 60 of the cable and the sleeve portion 56 of insulating sheath 54. Connecting sleeve 64 is preferably of insulating material like insulation covering 60 and sheath 54, such, for example, as rubber, and when the sleeve has been moved to the position shown in Fig. 4, it may be secured in this position in any desired manner, such as, for example, by cementing or vulcanizing. The connection between the cable and interrupting device thus made may be left in the condition shown in Fig. 4, or finished over in any desired manner, such, for example, as by taping or the like.

It is possible to utilize a network limiting device connected with network cable in the manner described above and shown in Fig. 4, only because applicants have provided a limiter which is entirely enclosed, and which is capable of interrupting the entire range of currents which may be encountered in the protection of the cable insulation without any external display whatsoever. This permits the forming, in effect, of a continuous sheath of insulation for the network limiting device and the cable which, as shown in Fig. 4, comprises insulation 60, 64, and 54, and which entirely encloses both the cable conductor and the conductor of the network limiting device, and remains in this condition even after an operation of the limiting device to interrupt the circuit. The advantages of such a continuous unbroken form of insulation are that not only is the insulation and connection of cable and limiting device adapted to be effected in a relatively simple manner, but because of the continuous nature of the resulting cable insulation, there is no possibility of the entrance of any foreign matter, such as dirt particles or moisture, to effect a breakdown of the insulation, because a circuit interrupting operation of the limiting device of this invention provides no break in the exterior insulation of either the interrupting device or the cable.

A somewhat modified form of network limiting device is shown in Fig. 5 of the drawings, wherein a tubular casing member 66 is provided of a mechanically strong, good heat conducting material like casing 2, previously described. The ends of tubular casing 66 are preferably internally threaded for receiving threaded closure plugs 68 of insulating material, such, for example, as fiber or the like. As shown, these closure plugs are provided with laterally extending flanges at the outer ends thereof adapted to tightly engage the outer end edges of tubular casing 66. Closure plugs 68 are also centrally apertured for the reception of terminal rods 70 of any good conducting material, such, for example, as copper or copper alloy. The terminal rods 70 are provided with enlarged heads 72 at the inner ends thereof to engage the inner side of closure plugs 68 and prevent longitudinal movement thereof outwardly of the casing. The heads 72 of the terminal rods are preferably tapped for threadedly receiving enlarged end portions 76 on a fusible rod 74 of conducting material, such, for example, as copper or the like. At the inner side of each closure plug 68, there is provided an insulating spacing washer 78 which may be of any desired insulating material, such, for example, as fiber or the like, and the spacing washers 78 are provided with central apertures to closely fit the enlarged heads 72 of terminal rods 70. Inwardly of spacing washers 78 are blocks 80 of an insulating material which is capable of evolving an arc extinguishing gas when in proximity to an electric arc, such, for example, as fiber, boric acid, or a synthetic resin. As shown in Fig. 5, the blocks 80 are provided with central apertures, the outer portions of which are of a size and form to closely fit enlarged ends 76 of fusible rod 74, and the portions thereof inwardly of the enlarged ends 76 are flared outwardly as at 82 for a purpose to be described. In order to maintain spacer washers 78 and blocks 80 in position, a spacing sleeve 84 is positioned between the blocks 80, and this sleeve is also preferably of a good heat conducting material, such, for example, as copper or other metal.

The operation of the interrupting device shown in Fig. 5 is substantially the same as that previously described in connection with Figs. 1 to 4 of the drawings, and, accordingly, the operation will not be again described in detail. However, it will be readily apparent that the metal vapor formed when fusible rod 74 melts will be removed from the arcing space by a condensing action, as in the embodiment of the invention shown in Figs. 1 to 4. One difference in the operation of this embodiment of the invention is that gases evolved by blocks 80, because of the flaring nature of arc passage 82 in the blocks, will be directed from the walls of this flared passage towards the center of the arc to thereby provide a very efficient blasting action of the gas through the arc to extinguish the same.

Figure 6:
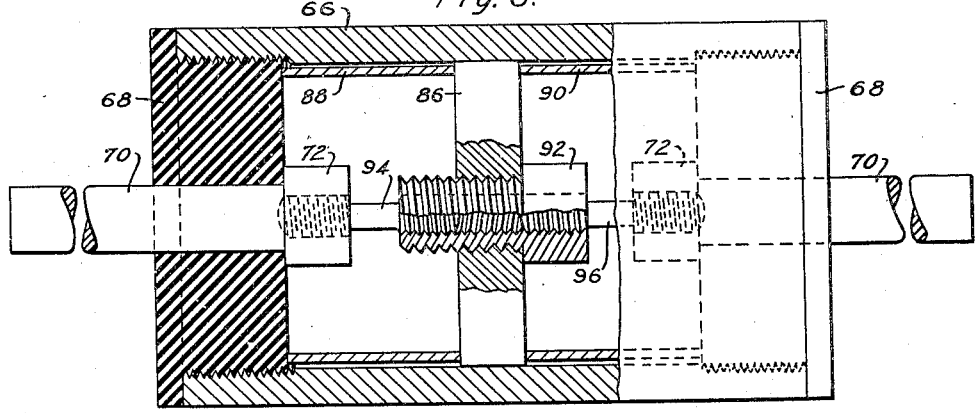
Fig. 6 is a view similar to Fig. 5 of another modification of interrupting device.

The embodiment of the invention illustrated in Fig. 6 of the drawings is quite similar to that illustrated in Fig. 5, and, accordingly, like reference numerals will be used to designate like parts, and such parts will not be again described in detail in order to avoid undue repetition. The embodiment of the invention shown in Fig. 6 differs mainly from that shown in Fig. 5 in that series arcs are provided within a casing of strong heat conducting material to provide a condensing action similar to that of the embodiments of the invention shown in Figs. 1 through 5 of the drawings. A partition disk 86 is provided intermediate the ends of tubular casing 66, and this disk may be of any desired material, either insulation or metal, so long as it fits snugly within casing 66 and is of sufficient strength not to break upon the occurrence of a circuit interrupting operation. Spacing sleeves 88 and 90 of a good heat conducting material are provided between partition disk 86 and closure plugs 68, respectively, in order to maintain the disk in its central position relative to the casing even after a circuit interrupting operation. Partition disk 86 is provided with a centrally located tapped hole for receiving a headed bolt 92. Each end of bolt 92 is provided with a tapped hole for threadedly receiving the enlarged threaded ends of fusible rods 94 and 96, with the opposite end of each fusible rod being threaded into a tapped hole in heads 72 of the terminal rods, respectively. Fusible rods 94 and 96 may be of any desired conducting material, such, for example, as copper or a copper alloy.

The operation of this embodiment of the invention is much like that of the devices previously described, and differs therefrom only in that by the provision of series arcs the voltage drop is increased during interruption because the sum of the drops of the two arcs produced when fusible rods 94 and 96 melt will be greater than that of a single arc. Also, when fusible rods 94 and 96 melt, the arc terminals will be constituted by the enlarged heads of terminal rods 70 and bolt 92, rather than by enlargements on the fusible rods themselves, as in the embodiment of the invention shown in Fig. 5. Pressure is limited in this embodiment of the invention by the condensing action of spacing sleeves 88, 90 and casing 66, as in the embodiments of the invention previously disclosed, and because series arcs are provided with their attendant higher voltage drop, good interrupting ability is obtainable without the use of any other arc extinguishing means.

Figure 7:
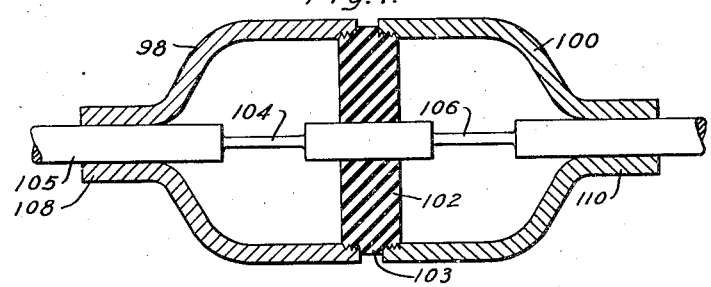
Fig. 7 is a longitudinal sectional view of still another form of network limiting device.

In Fig. 7 of the drawings, there is illustrated an alternative method of forming a condensing casing wherein a pair of substantially bell-shaped metal casing sections 98 and 100 are provided, with the open ends of the casing sections threaded onto a partition disk 102 of insulating material, such, for example, as fiber or a molded insulation material. The periphery of partition disk 102 is provided with a projecting unthreaded portion 103 for limiting the amount casing sections 98 and 100 may be drawn together and provide a predetermined insulating gap between the casing sections, which gap is determined by the voltage of the circuit in which the device is to be used. The closed ends of casing sections 98 and 100 are provided with sleeve-like extensions 108 and 110, respectively, for receiving a conductor rod 105 adapted to extend through the casing sections and through a central aperture provided in partition disk 102. Conductor rod 105 may be secured in position in sleeve portions 108 and 110 in any desired manner, such, for example, as by welding, swedging or the like. Conductor rod 105 is provided with spaced portions 104 and 106 on opposite sides of partition disk 102, respectively, which are reduced in cross section to form fusing points.

The operation of the embodiment of the invention shown in Fig. 7 is quite similar to that previously described in connection with the species of the invention shown in Figs. 1 to 6, in that when fusible portions 104 and 106 melt on overload currents, the metal vapor introduced into the arcing spaces is quickly condensed by the condensing action of casing sections 98 and 100, and the arc extinguished as before. Although the casing construction shown in Fig. 7 is provided with a conductor rod having a pair of fusible sections, this particular casing construction could also be used with a conductor having a single fusible section as in Figs. 1 to 5, in which case partition disk 102 could be made in the form of a ring with the fusible section centrally located in the casing.

In the foregoing, there has been disclosed circuit interrupting devices particularly adapted for use in limiting currents in network systems of a value which might cause damage to the cable insulation. As previously stated, these currents are of a high value, so that the device must be capable of interrupting currents as high as 70,000 amperes without any external display whatsoever. Obviously every overload which might be injurious to cable insulation may not be as high as 70,000 amperes so that in addition to having this high current interrupting ability, it is necessary that the device be also capable of interrupting an entire current range down to a few thousand amperes. The ability of the interrupting device disclosed to fulfill these requirements renders it ideal for the purpose of protecting network cable insulation because it can be assembled with the cable as shown in Fig. 4 of the drawings, in a simple manner so that the device and cable will be enclosed in a continuous sheath of insulating material which is not ruptured even though the network cable and device be subjected to currents of a value high enough to destroy the cable. The high interrupting capacity obtained by the devices herein disclosed are due to the condensing action of the casings which act to instantly remove metal vapor from the arcing space. This action when used in a single arc interrupter with a material capable of evolving an arc extinguishing gas in response to the striking of an arc, or when used in a series arc device providing a large voltage drop, provides the desired high interrupting capacity. Furthermore, by utilizing a casing having a condensing action, it is possible to use a metal casing which will readily withstand the high pressures produced upon a circuit interrupting operation, which pressures are of the order of 1,000 to 2,000 pounds per square inch and above.

In the single arc interrupting devices disclosed, arc extinction is facilitated by the use of a limited amount of gas evolving material which is located relative to the arc in a manner such that predetermined quantities of gas are emitted so as to not substantially increase the pressure within the fuse housing, but at the same time to get the optimum benefit from the gas emitted, and obtain a predetermined volume of gas at both high and low currents, so that the device will be capable of efficient and fast circuit interruption throughout the entire current range. In the embodiment of the invention shown in Fig. 5, the gas evolving material is also of a limited character and located so as to direct the gas relative to the arc in an optimum manner. Moreover, several species of circuit interrupters have been disclosed, each having one or more of the features enumerated above, and all particularly adapted for use as network limiting devices.

Having particularly described preferred embodiments of the invention in accordance with the patent statutes, it is desired that the invention be not limited to these particular embodiments inasmuch as it will be obvious to those skilled in the art that many changes and modifications may be made in these particular embodiments without departing from the broad spirit and scope of this invention. Therefore, it is desired that the invention be interpreted as broadly as possible, and that it be limited only as required by the prior art.

We claim as our invention:

1. In a totally enclosed high current circuit interrupting device, a tubular casing of a strong, good heat conducting material, closure members of insulating material secured to the ends of said casing, relatively massive fusible means in said casing and having at least the major portion thereof exposed to inner walls thereof, said fusible means being of a low resistance material and said fusible means being supported from said closure members.

2. In a totally enclosed high current circuit interrupting device, a tubular casing of a non-magnetic metal, apertured closure members of insulating material for the ends of said casing, fusible means in said casing and having at least the major portion thereof exposed to inner walls thereof, terminals for said fusible means extending, respectively, through the apertures in said closure members and of a size to fill said apertures.

3. In a totally enclosed circuit interrupting device, a casing comprising complementary cup-shaped sections of metal, coupling means of insulating material for insulatingly coupling the open ends of said sections, and fusible means in said casing, said fusible means connected between said sections and exposed to inner walls thereof.

4. In a totally enclosed circuit interrupting device, a casing comprising complementary cup-shaped sections of a strong, good heat conducting material, coupling means of insulating material for insulatingly coupling the open ends of said sections, fusible means in said casing, and said fusible means connected between said sections and exposed to inner walls thereof.

5. In a totally enclosed high current circuit interrupting device, a casing having wall portions of a strong, good heat conducting material, relatively massive fusible means of a low resistance material in said casing, and said wall portions of said casing being directly exposed to at least the major portion of said fusible means so that metal vapor engaging said wall portions when said fusible means melts, will be condensed.

6. In a totally enclosed circuit interrupting device, a tubular casing, apertured closure members secured to the ends of said casing, fusible means in said casing, terminals for said fusible means extending, respectively, through the apertures in said closure members, and spaced laterally extending shoulder means on each of said terminals for engaging opposite outer surfaces of each of said closure members, respectively, for preventing relative movement between said terminals and closure members upon the occurrence of a circuit interrupting operation.

7. In a totally enclosed circuit interrupting device, a tubular casing of a strong, good heat conducting material, apertured closure members of insulating material secured to the ends of said casing, fusible means in said casing and exposed to inner walls thereof, terminals for said fusible means extending, respectively, through the apertures in said closure members, and means of a material capable of evolving an arc extinguishing gas when in proximity to an electric arc forming wall portions adjacent a minor portion only of the arc formed upon fusion of said fusible means.

8. In a totally enclosed circuit interrupting device, a tubular casing of a strong, good heat conducting material, apertured closure plugs of insulating material for the ends of said casing, fusible means in said casing and exposed to inner walls thereof, terminals for said fusible means extending, respectively, through the apertures in said plugs, and means of a material capable of evolving an arc extinguishing gas when in proximity to an electric arc forming wall portions adjacent one end of said fusible means, and said wall portions flaring outwardly toward the remainder of said fusible means.

9. In a totally enclosed high current circuit interrupting device, a tubular casing of a strong, good heat conducting material, apertured closure members of insulating material secured to the ends of said casing, terminals extending, respectively, through the apertures of said closure members, fusible material in said casing at least the major portion of which is directly exposed to the inner walls of said casing, said fusible material being connected between said terminals, the inner portion of one of said terminals being in heat-transfer relation relative to said fusible material and being fusible at substantially the same temperature as said fusible material, means forming a restricted passage at least about said inner terminal portion including inner wall portions of a material capable of evolving an arc extinguishing gas when in proximity to an electric arc, whereby on fusion of said fusible material at least a portion of said terminal portion may be melted and cause evolution of gas from said gas evolving material to aid in extinguishing the arc.

10. In a totally enclosed circuit interrupting device, a tubular casing, apertured closure plugs for the ends of said casing, an elongated unitary conductor extending through said casing and through the apertures in said plugs, a part of said conductor within said casing being reduced in section to form a fusible portion, and said conductor having spaced pairs of spaced shoulders with the shoulders of each pair positioned at opposite sides of one of said plugs.

11. In a totally enclosed circuit interrupting device, a tubular casing of metal, an elongated conductor of a length to extend through said casing and beyond the ends thereof, closure plugs for the ends of said casing of a molded insulation material molded on said conductor, a part of said conductor within said casing being reduced in section to form a fusible portion, and the ends of said casing being bent over said plugs, respectively, to prevent movement of said plugs outwardly of said casing.

12. In a totally enclosed circuit interrupting device, a tubular casing of metal, an elongated conductor of a length to extend through said casing and beyond the ends thereof, closure plugs for the ends of said casing of a molded insulation material molded on said conductor, a part of said conductor within said casing being reduced in section to form a fusible portion, the ends of said casing being bent over said plugs, respectively, to prevent movement of said plugs outwardly of said casing, and the material of said casing inwardly of said plugs being deformed inwardly to prevent movement of said plugs inwardly of said casing.

13. In a totally enclosed circuit interrupting device, a tubular casing of metal, apertured closure plugs of insulating material for the ends of said casing, fusible means in said casing and exposed to inner walls thereof, terminals for said fusible means extending, respectively, through the apertures in said plugs, said plugs being secured to said casing and terminals to prevent relative longitudinal movement thereof, the inner portion of one of said terminals being in heat-transfer relation relative to said fusible means and being fusible at substantially the same temperature as said fusible means, means forming a restricted passage at least about said inner terminal portion including inner wall portions of a material capable of evolving an arc extinguishing gas when in proximity to an electric arc, whereby on fusion of said fusible means a portion of said terminal portion will be fused to cause evolution of gas from said gas evolving material to aid in extinguishing the arc.

14. In a totally enclosed circuit interrupting device, a tubular casing of metal, an elongated conductor of a length to extend through said casing and beyond the ends thereof, closure plugs for the ends of said casing of a molded insulation material molded on said conductor, a part of said conductor within said casing being reduced in section to form a fusible portion, the material of said casing being deformed to maintain said plugs against longitudinal movement, and a protective washer on at least one side of each plug between the plug and the adjacent casing deformation.

15. In a totally enclosed interrupting device, a tubular casing of metal, apertured closure plugs of insulating material for the ends of said casing, terminals extending, respectively, through the apertures of said plugs, fusible material in said casing and connected between said terminals, the inner portion of one of said terminals being in heat-transfer relation relative to said fusible material and being fusible at substantially the same temperature as said fusible material, a washer secured in said casing adjacent said one terminal and having an opening forming a restricted passage at least about said inner terminal portion including inner wall portions of a material capable of evolving an arc extinguishing gas when in proximity to an electric arc, whereby on fusion of said fusible material a portion of said terminal portion will be melted and cause evolution of gas from said gas evolving material to aid in extinguishing the arc.

16. A unitary conducting member comprising an elongated conducting member having at one end thereof a terminal socket, said member having terminals of reduced section adjacent but spaced from opposite ends thereof, closure plugs of insulating material molded on said terminals, and a fusible section between said terminals still further reduced in section.

17. A unitary conducting member comprising a tube of conducting material flattened except at one end thereof to provide a terminal socket, at least one side of the flattened portion of said member being cut away between opposite ends of said member to form terminals of differing reduced section, and a fusible section between said terminals still further reduced in section.

18. In a circuit interrupting device, a fuse holder having spaced terminals thereon, a fusible member in said holder and connected between said terminals, means forming a restricted passage for said fusible member and including inner wall portions of a material capable of evolving an arc extinguishing gas when in proximity to an electric arc, said passage extending along said fusible member only a minor portion of the length thereof, whereby to evolve a predetermined quantity of arc extinguishing gas upon fusion of said strip of fusible material.

19. In a circuit interrupting device, a fuse holder having spaced terminals thereon, fusible material in said holder and connected between said terminals, the inner portion of one of said terminals being in heat-transfer relation relative to said fusible material and being fusible at substantially the same temperature as said fusible material, means forming a restricted passage about said inner terminal portion and the adjacent end only of said fusible material and including inner wall portions of a material capable of evolving an arc extinguishing gas when in proximity to an electric arc, whereby on fusion of said fusible material on light over-loads sufficient heat is conducted to said terminal portion to fuse at least a portion thereof and cause evolution of gas from the entire length of the restricted passage through said gas evolving material to aid in extinguishing the arc.

20. A totally enclosed high current circuit interrupting device comprising an enclosure capable of withstanding relatively high internal pressures, a low resistance fusible element relatively large in cross section in said enclosure connected between terminals extending through walls of said enclosure at spaced points, and the walls of said enclosure at least at points opposite the major portion of said fusible element being directly exposed to said element and comprising a good heat conducting nonmagnetic material.

21. A totally enclosed high current circuit interrupting device comprising a tubular member closed at its ends, conducting means extending longitudinally through said tubular member and including a fusible section of less length than said tubular member, and said tubular member being of a good heat conducting material and directly exposed to at least the major portion of said fusible section to provide a relatively large area for condensing the metal vapor upon fusion of said fusible section.

22. A totally enclosed high current circuit interrupting device comprising an enclosure capable of withstanding relatively high internal pressures, terminals extending through walls of said enclosure at spaced points, an elongated fusible element connected between said terminals within said enclosure, and said enclosure having wall portions opposite and directly exposed to substantially the entire length of said fusible element and of greater length than said fusible element and said wall portions being of a good heat conducting material to form a relatively large condensing surface for metallic vapor formed upon fusion of said fusible element.

23. A totally enclosed high current circuit interrupting device comprising a tubular member closed at its ends, conducting means extending longitudinally through said tubular member and including a fusible section, and said tubular member being of a nonmagnetic good heat conducting material and directly exposed to at least the major portion of said fusible section to provide a relatively large area for condensing the metal vapor upon fusion of said fusible section.

24. A totally enclosed high current circuit interrupting device comprising a tubular member closed at its ends, conducting means extending longitudinally through said tubular member and including a fusible section, and means of a material capable of evolving an arc extinguishing gas when in proximity to an electric arc disposed in proximity to a portion only of the arc formed upon fusion of said fusible section to limit the amount of gas evolved and thereby limit the pressures developed in said device upon a circuit interrupting operation.

25. In a high current interrupting device, a tubular support having spaced terminals thereon, means for striking an arc in said support between said terminals, and a single means of a material capable of evolving an arc extinguishing gas when in proximity to an electric arc disposed in proximity to a portion only of the arc formed upon fusion of said fusible section to limit the amount of gas evolved and thereby limit the pressures developed in said device upon a circuit interrupting operation.

26. In a high current circuit interrupting device, a tubular support having spaced terminals thereon, means for striking an arc in said support between said terminals, and a single means of a material capable of evolving an arc extinguishing gas when in proximity to an electric arc disposed in proximity to one end only of the arc formed upon fusion of said fusible section to limit the amount of gas evolved and thereby limit the pressures developed in said device upon a circuit interrupting operation.

27. In a totally enclosed circuit interrupting device, a tubular casing of metal, an elongated conductor of a length to extend through said casing and beyond the ends thereof, closure plugs for the ends of said casing of insulation material secured on said conductor, a part of said conductor within said casing being reduced in section to form a fusible portion, the ends of said casing being bent over said plugs, respectively, to prevent movement of said plugs outwardly of said casing, and the material of said casing inwardly of said plugs being deformed inwardly to prevent movement of said plugs inwardly of said casing.

28. A unitary structure comprising an elongated conducting member having a pair of spaced shoulders adjacent each end thereof, and closure plugs of insulating material molded on said member with each plug positioned between a pair of said shoulders.

HERBERT L. RAWLINS.
JAMES M. WALLACE.